April 1, 1924.

M. A. LAWTON 1,488,604

SUCTION VALVE CONSTRUCTION

Filed Jan. 5, 1923

Inventor.
Mark A. Lawton
by Heard Smith & Tennant.
Attys.

Patented Apr. 1, 1924.

1,488,604

UNITED STATES PATENT OFFICE.

MARK A. LAWTON, OF NEWTON, MASSACHUSETTS.

SUCTION-VALVE CONSTRUCTION.

Application filed January 5, 1923. Serial No. 610,948.

*To all whom it may concern:*

Be it known that I, MARK A. LAWTON, a citizen of the United States, and resident of Newton, county of Middlesex, State of Massachusetts, have invented an Improvement in Suction-Valve Constructions, of which the following description, in connection with the accompanying drawing, is a specification, like characters on the drawing representing like parts.

This invention relates particularly to valves to be used in a tank of liquid, at the bottom of a suction pipe leading from the tank to a pump, and has for its object to provide a new and improved valve construction.

The valve construction in common use is a single casing with two valves. This requires that the lower valve, which is put in first, shall be smaller than the upper valve. It is desirable that both valves should be of the same size because the flow through both must be the same. No strainer is used in the common construction but small slits are cut in the base of the casing which, if small enough for effective straining purposes, may not permit the ready flow of gasoline.

One of the objects of the present invention is to provide a valve construction in which the valves are easily accessible.

A further object of the present invention is to provide a valve construction in which either valve is accessible without removing the other.

A further object of the present invention is to provide a valve construction which is easily and quickly assembled.

A further object of the present invention is to provide a valve construction in which the valves are both of the same size and interchangeable.

Other objects and features of the invention will more fully appear from the following description and accompanying drawings and will be particularly pointed out in the claims.

The drawings illustrate both in elevation and detail, a preferred form of a valve construction embodying the broad principles of the invention.

Figure 1:
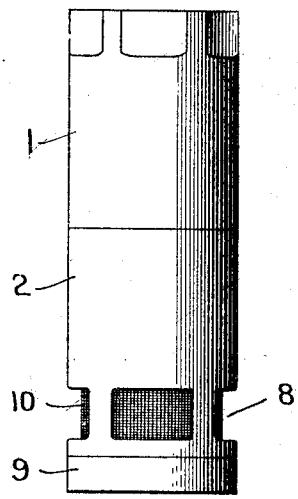
Fig. 1 is a side view of the assembled casing.
Figure 2:
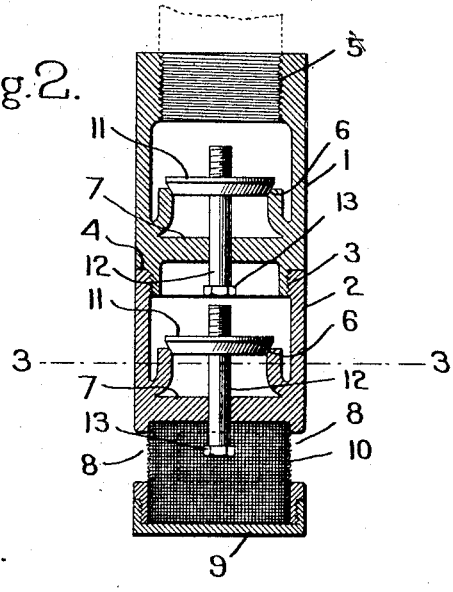
Fig. 2 is a section down the center of the casing, with the valves shown in elevation.
Figure 3:
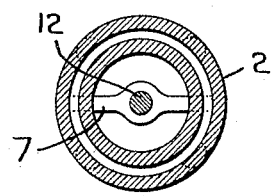
Fig. 3 is a section on line 3—3, Fig. 2.

The valve construction illustrated is designed to be used at the bottom of a suction pipe in a gasoline reservoir for filling stations, particularly in the suction pipe of a visible measuring tank in which some means must be used absolutely to prevent any leakage from the visible measuring tank back to the gasoline reservoir. The parts of the valve construction must be so made as to fit with great accuracy in order to prevent such leakage.

As illustrated herein, the valve construction comprises a casing having upper and lower separable sections, 1 and 2 respectively. In the preferred form, the sections are connected by means of accurately cut threads, 3, and accurately turned horizontal abutting portions, 4. The upper section is threaded, as at 5, for connection with the bottom of the suction pipe. An identical valve seat, 6, is located in each section and separated from the walls of the casing, so that the valve seats will not be distorted when the sections are screwed together and set up by a wrench. A web, 7, is located below each valve seat and has an opening which is directly below the center of the seat.

The lower section of the valve casing has openings, 8, formed in its walls below the web, and an open end with a removable closure, 9. A strainer, 10, covers the openings in the walls of the casing, and in the preferred form is cylindrical in shape, exactly fitting the open end of the lower casing and adapted to be held in place by the removable closure, 9, preferably a threaded metal cap, at the bottom of the lower casing which forces the strainer against the lower web.

The valves used in the construction are identical, having heads, 11, ground accurately to fit the valve seats, and stems, 12, projecting through the openings in the webs. The ends of the stems have means thereon for preventing the stems from entirely withdrawing from the openings in the webs and in the preferred form of construction such means are nuts, 13, screwed onto the ends of the stems.

Having thus described the invention, what is claimed as new, and desired to be secured by Letters Patent, is

1. A valve assembly comprising a casing having an upper and a lower portion, a valve seat in each of said portions integral therewith and spaced therefrom and situated well toward the middle of the respective casing portions, a web located below each valve seat bridging each casing portion and provided with an opening directly below the center of said valve seat, valves with heads adapted to fit tightly the valve seats, stems integral with the heads and adapted to pass through the openings in the web, and means to join the casing portions.

2. A valve assembly comprising a casing having an upper portion with a threaded flange on the lower end thereof and a lower portion provided with openings through its walls at the lower end thereof and having its upper end threaded for engagement with the threads on the flange, a web integral with the upper casing portion extending across said portion near the lower end thereof and above the flange, a web integral with the lower casing portion extending across said portion near the lower end thereof and above the openings, a valve seat in each casing portion integral therewith at the juncture of the web and casing, said valve seats extending toward the middle of the respective casing portions parallel with but spaced from the casing, valves with heads adapted to fit tightly the valve seats, and stems integral with the heads and adapted to pass through and be guided by openings in the webs.

In testimony whereof, I have signed my name to this specification.

MARK A. LAWTON.